United States Patent [19]

Hertel

[11] Patent Number: 4,906,250

[45] Date of Patent: Mar. 6, 1990

[54] PROCESS FOR THE PREPARATION OF WATER-INSOLUBLE AZO DYES ON THE FIBER: IMPREGNATING WITH COUPLING COMPONENT AND TREATING WITH DIAZONIUM SALT OF 4-CHLORO-2,5-DIALKOXY ANILINE

[76] Inventor: Hasso Hertel, Hoechst Aktiengesellschaft, P.O. Box 80 03 20, D-6230 Frankfurt am Main 80, Fed. Rep. of Germany

[21] Appl. No.: 256,693

[22] Filed: Oct. 12, 1988

[30] Foreign Application Priority Data

Oct. 13, 1987 [DE] Fed. Rep. of Germany ....... 3734520

[51] Int. Cl.$^4$ .......................... D06P 1/12; D06P 3/68; C09B 29/01
[52] U.S. Cl. .......................................... 8/666; 8/696; 8/918
[58] Field of Search .............................................. 8/666

[56] References Cited

U.S. PATENT DOCUMENTS 4,306,876 12/1981 Hertel ................................. 8/527

OTHER PUBLICATIONS

E. R. Trotman, "Dyeing and Chemical Technology of Textile Fibres," (Wiley—Interscience), Sixth Edition, 1984, pp. 385–386.

Primary Examiner—A. Lionel Clingman

[57] ABSTRACT

According to the procedures of the ice color dyeing technique, fiber materials, such as, for example, cellulose fiber materials, are dyed by coupling the fiber material bottomed with a coupling component in an aqueous medium with the diazonium compound of an aniline compound of the general formula (1) mentioned and defined below, the coupling reaction and dye formation on the fiber being carried out at a pH between 3 and 10

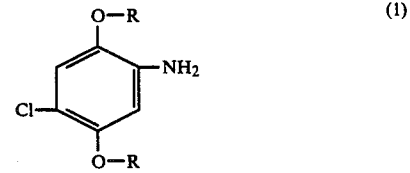

(1)

in which R stands for a straight-chain or branched alkyl group of 3 or 4 carbon atoms.

9 Claims, No Drawings

PROCESS FOR THE PREPARATION OF WATER-INSOLUBLE AZO DYES ON THE FIBER: IMPREGNATING WITH COUPLING COMPONENT AND TREATING WITH DIAZONIUM SALT OF 4-CHLORO-2,5-DIALKOXY ANILINE

DESCRIPTION

The present invention is in the technical field of ice color dyeing.

The preparation of dyeings having good fastness properties by the methods of ice color dyeing by the synthesis of water-insoluble azo dyes on the fiber by reaction of a diazo component with a coupling component has been described in numerous publications dating back many years. Especially the formation of dyes having a coupling component of the N-aryl-2-hydroxynaphthalene-3-carboxamide series has acquired practical importance. The diazo components proposed for this purpose also include 4-chloro-2,5-dimethoxyaniline (see US Patent 4,306,876, Example 9). Upon reaction with N-aryl-2-hydroxynaphthalene-3-carboxamide compounds as the coupling components, this diazo component produces on the fiber blue-red to red-violet dyeings having sufficiently good fastness properties. However, it was desirable to obtain improved dyeings by using diazo components of similar structure.

It has now been found that dyeings having improved properties, in particular better wet fastness properties, can be produced on the fiber by the methods of ice color dyeing by using as the diazo component an aniline compound corresponding to the general formula (1)

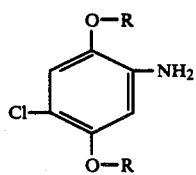

in which R stands for a straight-chain or branched alkyl group of 3 or 4 carbon atoms. Accordingly, the present invention relates to a process for the preparation of water-insoluble azo dyes on the fiber, in particular on a cellulose fiber, by the methods of ice color dyeing, according to which the fiber material bottomed with a coupling component is brought into contact in an aqueous medium with the diazonium compound of an aromatic amine and a coupling reaction is carried out, which comprises coupling as the diazo component a compound of the above-mentioned and defined general formula (1) with a coupling component customary in ice color dyeing, in particular with one of the N-aryl-2-hydroxynaphthalene-3-carboxamide series, the coupling reaction and dye formation on the fiber being carried out at a pH between 3 and 10, preferably between 4 and 6, in an aqueous medium.

The coupling components are preferably compounds corresponding to the general formula (2)

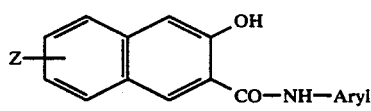

in which Z is preferably bound in the 6- or 7-position and stands for a hydrogen atom or a halogen atom, such as a bromine atom, or stands for an alkoxy group of 1 to 4 carbon atoms such a methoxy or ethyoxy group, and aryl denotes a phenyl radical or a 1-naphthyl radical, which can both be substituted by 1, 2 or 3 substituents from the group consisting of halogen such as bromine and in particular chlorine, nitro, alkyl of 1 to 4 carbon atoms, such as ethyl and in particular methyl, and alkoxy of 1 to 4 carbon toms such as ethoxy and in particular methoxy.

In the compounds of the general formula (1), R is, for example an n-propyl, 1-methylethyl, n-butyl, 1-methylpropyl, 2-methylpropyl or 1,1-diemthylethyl group.

Compounds of the general formula (1) are 4-chloro-2,5-di(n-propoxy)aniline, 4-chloro-2,5-di(n-butoxy)aniline, 4-chloro-2,5-di(isopropoxy)aniline, 4-chloro-2,5-di(1-methylpropoxy)aniline, 4-chloro-2,5-di(2-methylpropoxy)aniline and 4-chloro-2,5-di(1,1-diemthylethoxy)aniline.

Coupling components, for example those of the general formula (2), which can be used in the process according to the invention, are for example: the phenylamide, the 2-methylphenylamide, the 2-ethylphenylamide, the 2-methoxyphenylamide, the 4-methoxyphenylamide, the 2-ethoxyphenylamide, the 4-chlorophenylamide, the 4-chloro-2-methylphenylamide, the 3-nitrophenylamide, the 5-chloro-2-methoxypheylamide, the 4-methoxy-2-methylphenylamide, the 2,5-dimethoxyphenylamide, the 5-chloro-2,4-dimethoxyphenylamide, the 4-chloro-2,5-dimethoxyphenylamide, the 4-chloro-2-methoxy-5-methylphenylamide, the 5-bromo-2-methoxyphenylamide and the naphth-1-ylamide of the 2-hydroxynaphthalene-3-carboxylic acid, the N-(2-methoxyphenyl)-6-bromo-2-hydroxynaphthalene-3-carboxamide, N-phenyl-6-methoxy-2-hydroxynaphthalene-3-carboxamide and N-(4-chloro-2,5-dimethoxyphenyl)-6-methoxy-2-hdroxynapthahalene-3-carboxamide.

In the coupling component of the general formula (2) usable in the process according to the invention, Aryl preferably denotes a phenyl, 2-methylphenyl, 2-methoxyphenyl, 4-methoxyphenyl, 2-ethoxyphenyl, 4-ethyoxyphenyl, 4-methoxy-2-methylphenyl, 2,5-dimethoxyphenyl, 4-chlorophenyl, 4-chloro2-methylphenyl, 5-chloro-2-methoxyphenyl, 4-chloro-2-methoxy-5-methylphenyl, 4-chloro-2,5-dimethoxyphenyl, 5-chloro-2,4-dimethoxyphenyl radical and a 1-naphthyl radical.

By using the diazo component corresponding to the general formula (1) according to the invention, the azo dyes can be formed according to the methods of the ice color dyeing technique, which have been extensively described in the literature (see, for example, H. Rath, Lehrbuch der Textilchemie (Textbook of Textile Chemistry) 3rd Ed., Springer Verlag (1972), pages 548 ff., and K. Venkataraman, The Chemistry of Synthetic Dyes, Vol. I, Academic Press, New York (1952), pages 650–704).

For this purpose, a fiber material, in particular a cellulose fiber material, which had previously been prebottomed with the coupling component under alkaline conditions, is brought into contact with the diazonium compound of the aniline corresponding to the general formula (1) in an aqueous medium. This is usually done by, analogously to conventional methods of the ice color dyeing technique, combining the material which had been bottomed with an alkaline aqueous solution of the coupling component with a separately prepared aqueous solution of the diazonium salt, which contains acidic and/or buffer substances to such a level that a pH range between 3 and 10, preferably between 4 and 6, is established, after which the coupling reaction then takes place within this pH range. However, it is also possible to diazotize the chlorodialkoxyaniline compound in an aqueous medium in the presence of the bottomed material, the coupling reaction being carried out at the same time or afterwards; in this variation, either the diazotization is carried out in the weak acidic medium or the pH is brought, after the diazotization, to a value between 3 and 10, which is favorable for the coupling reaction.

In all these embodiments, it is desirable that the amount of acid used in the diazotization and/or the amount of alkali in the bottomed material or aqueous medium in which the bottomed material to be dyed is present is chosen beforehand such that, by the addition of buffer substances or buffer mixtures if necessary, the desired pH for the coupling to be carried out can be established immediately.

The diazotization of compounds (1) is carried out at the temperatures customary in the ice color dyeing technique, for example at a temperature between $-5°$ C. and $+35°$ C., preferably $0°$ to $10°$ C.

In detail, the procedure can be, for example, as follows: the chlorodialkoxyaniline compound of the formula (1) is diazotized, preferably in dilute aqueous hydrochloric acid, by means of an aqueous sodium nitrite solution; excess mineral acid is then bound by an acid-binding agent, for example sodium acetate, sodium bicarbonate or sodium phosphate, and the aqueous diazonium salt solution is subsequently used, if necessary after addition of an alkali-binding agent such as acetic acid, sodium dihydrogenphosphate, boric acid or chromium acetate, as dyeing liquor or bath. This liquor or bath can be applied by means of a pad-mangle to the material to be dyed, in this case in particular to a fabric which had previously been impregnated with the alkali metal salt of the coupling component and had been dried. It is also possible to use this liquor in such a manner that this aqueous diazonium salt solution, which is used as the dyeing bath, is entered with the impregnated material to be dyed, as in the form of a fabric or in the form of threads or yarns and the material is agitated therein, either by hand or by or in appropriate apparatuses customary in the art, such as a reel beck, a jigger or a jet machine. During this process, the required coupling range of between 3 and 10 is established and maintained by appropriate acid-binding or alkalibinding agents or buffer substances.

In the diazotization, it is also possible to use, instead of dilute aqueous hydrochloric acid, dilute aqueous sulfuric acid and also as a dilute aqueous medium-strong acid such as phosphoric acid, chloroacetic acid, lactic acid, glycolic acid or formic acid. The diazotization can also be carried out in an aqueous phase in which the viscosity had been increased by means of a conventional print thickening.

Another variation of dye formation is that by a printing process, by thickening the aqueous solution of the diazonium salt with a suitable agent customary in the art, such as starch, tragacanth, a cellulose ether or cellulose ester, and printing a fabric impregnated with the alkali metal salt of the coupling component with this thickened solution, a corresponding coupling pH between 3 and 10 being established and maintained also in this case by suitable selection of the acid-binding or alkali-binding agents or buffer substances using the amounts required for this.

Another variation of the process according to the invention for the preparation of azo dyes with a diazo component of the formula (1) and a corresponding coupling component on the fiber consists in printing a thickened emulsion or dispersion of the aniline compound of the formula (1), which additionally contains a weak or medium-strong acid, onto the fabric to be dyed which had previously been impregnated with the alkali metal salt of the coupling component and sodium nitrite.

The dyed material is subsequently, as is customary in the ice color dyeing technique, made ready for use by thorough rinsing with water, alkaline soaps, rinsing again with water and drying. The dyeings obtainable according to the invention have good fastness properties, in particular very good wet fastness properties, of which in particular the wash fastness at different temperatures, the peroxide wash fastness, the hydrogen peroxide fastness, the sodium carbonate boiling fastness, the mercerizing fastness, the bleaching fastness, the dry cleaning fastness and crock fastness can be mentioned in particular.

The compounds of the general formula (1) can be prepared analogously to known procedures, starting from the corresponding 1,4-dialkoxybenzenes by either chlorination of the corresponding 1,4-dialkoxybenzene, reaction of the resulting 4-chloro-1,4-dialkoxybenzene with a nitrating agent and subsequent reduction of the nitro group to the amine group or by nitration of the 1,4-dialkoxybenzene, reduction of the nitro group introduced and chlorination of the 2,5-dialkoxyaniline after previous acetylation of the amino group and subsequent deacetylation.

The aniline compounds used according to the invention are distinguished by a low mutagenic potential. Thus, 4-chloro-2,5-di(n-butoxy)aniline shows a negative response in the Ames test (see B.N. Ames et al., Proc. Nat. Acad. Sci. USA 70, 2281–2285 (1973); B.N. Ames et al., Mutation Res. 31, 347–364 (1975)).

The Examples which follow serve to illustrate the invention. Parts and percent are by weight, unless stated otherwise. Parts by weight relate to parts by volume as the kilogram relates to the liter.

Dyeing Example 1

To produce a dyeing on a cotton fabric, the fabric is first impregnated with an aqueous bottoming liquor composed of a solution of 20 parts of N-(2'-methoxyphenyl)2-hydroxynaphthalene-3-carboxamide, 8.3 parts of sodium hydroxide and 5 parts of a commercially available protective colloid in 1,000 parts of water. The liquor pickup should be 70 % of the weight of the goods. The impregnated fabric is dried at about 130° C. and subsequently cross-padded with an aqueous developing liquor containing the diazonium salt of 4-chloro-2,5-di(n-butoxy)aniline at a liquor pick-up of 70 %, relative to the weight of the goods. The developing liquor is prepared by diazotization of 21.5 parts of 4-chloro-2,5-di(n-butoxy)aniline in 215 parts of a 4 % strength aqueous hydrochloric acid solution by means of 15 parts of a 40 % strength aqueous sodium nitrite solution, followed by the addition of 13 parts of sodium acetate trihydrate and 10 parts of acetic acid and making up the resulting diazonium salt solution with water to 1,000 parts.

After the cross-padding with the developing liquor, the cross-padded fabric is subjected to an air passage of about 1 minute and then to a hot water passage. The aftertreatment of the dyeing obtained is carried out in a conventional manner, for example by rinsing the dyed fabric in cold and hot water, by boiling it for about 15 minutes in a bath containing a nonionogenic detergent, by rinsing again in hot and cold water and drying.

This gives a bordeaux dyeing having very good fastness properties, of which in particular the good wet fastness properties may be mentioned.

Dyeing Example 2

(a) First the following bottoming liquor is prepared: 15.3 parts of N-(5'-chloro-2'-methoxyphenyl)-2-hydroxynaphthalene-3-carboxamide are made into a paste with 36 parts of ethanol and dissolved by addition of 10.6 parts of a 32 % strength aqueous sodium hydroxide solution and 23 parts of water of 40° C. 7.6 parts of a 33 % aqueous formaldehyde solution are added, and the stock solution thus prepared is stirred after 10 minutes into a warm solution of 35° C. composed of 58 parts of a 32 % strength aqueous sodium hydroxide solution, 120 parts of sodium chloride and 18 parts of a commercially available fatty acid/protein degradation product/condensation product in 6,000 parts of soft water. In a package-dyeing machine, this bottoming liquor is pumped through a package containing 600 parts of cotton yarn, which had been scoured under alkaline conditions with a surfactant and a sequestering agent to remove interfering non-cellulose substances, for 30 minutes. The bottoming liquor is then discharged and the bottomed package is rinsed for 10 minutes with a solution of 240 parts of sodium chloride and 4 parts of a 32 % strength aqueous sodium hydroxide solution in 6,000 parts of water. The rinsing bath is then discharged.

(b) To the package-dyeing machine is then added a developing liquor, which is prepared as follows: 22.6 parts of 4-chloro-2,5-di(n-butoxy)aniline are mixed into a mixture of 100 parts of water and 29 parts of a 32 % hydrochloric acid with thorough stirring. About 30 parts of ice are added; the amine is then diazotized with thorough stirring by gradual addition of 6.9 parts of sodium nitrite in a concentrated aqueous solution. Stirring is continued for 30 minutes and this stock solution is then poured into a solution of 4 parts of acetic acid, 70 parts of sodium acetate trihydrate and 12 parts of an octadecylalcohol/polyglycol ether in 5,800 parts of water. This developing liquor is pumped at 20° C. for 30 minutes through the bottomed package and subsequently discharged from the machine. The package is then rinsed in a conventional manner with an aqueous acetic acid solution, then rinsed with cold water until the washwater remains clear and soaped first at 60° C., then at 100° C., subsequently rinsed with warm and cold water and finally dried.

This gives a bordeaux dyeing having good fastness properties, such as, in particular, wash fastness properties, in a good color yield.

Dyeing Example 3

(a) A warm mixture of about 35° C. composed of 4.5 parts of ethanol, 5.5 parts of water, 2.4 parts of a 32 % strength aqueous sodium hydroxide solution and 2 parts of a 33 % strength aqueous formaldehyde solution is poured over 3.5 parts of N-(naphth-1'-yl)-2-hydroxynaphthalene-3-carboxamide, which upon stirring dissolves. After about 10 minutes, this solution is added to 1,000 parts of water containing 8.5 parts of a 32.5 % strength aqueous sodium hydroxide solution and 2 parts of a fatty acid/protein degradation product/condensation product in solution. 50 parts of a bleached, scoured and prewetted cotton yarn are placed in the bath thus prepared and agitated therein for 30 minutes. It is then taken out and rinsed in a solution of 30 parts of sodium chloride and 1.3 parts of a 32 % strength aqueous sodium hydroxide solution in 1,000 parts of water.

(b) Separate from this bath, the developing bath is prepared as follows: 2.5 parts of 4-chloro-2,5-di(n-butoxy)aniline are stirred into a mixture of 20 parts of water and 3.2 parts of an aqueous 32 % strength hydrochloric acid solution. After stirring has been continued for some time, 5 parts of ice are added and the mixture is diazotized with 0.72 parts of ice are added and the mixture is diazotized with 0.72 parts of sodium nitrite in a concentrated aqueous solution. After the diazotization is completed, the solution is diluted with water to 1,000 parts, and 10 parts of sodium acetate trihydrate, 0.2 parts of acetic acid and 1 part of polyglycol alkyl ether are additionally dissolved therein.

(c) To produce the dyeing on the textile material, the following procedure is, for example, followed: the yarn bottomed, rinsed and freed from the excess liquor by squeezing off according to (a) is introduced into the developing bath described in (b) and treated therein at about 20° C. for 30 minutes. The material is then taken out, rinsed as usual, soaped, rinsed again and dried.

This gives a bordeaux dyeing having good fastness properties, in particular very good wash fastness properties, in a good color yield.

Dyeing Example 4

To produce a red printing pattern, the following procedure is, for example, followed: a cotton fabric is bottomed with N-phenyl-2-hydroxynaphthalene-3-carboxamide according to the procedure of Dyeing Example 1, dried and printed on a screen or roller printing machine with a print paste prepared as follows: 5.4 parts of sodium nitrite and then 23 parts of a solution composed of 50 % of 4-chloro-2,5-di(n-propoxy)aniline, 25 % of ethylene diglycol and 25 % of a reaction product of castor oil with 36 mole of ethylene oxide are stirred into 600 parts of a conventional aqueous print thickening. Separate from this solution, 18 parts of an 85 % strength aqueous phosphoric acid solution are stirred into 300 parts of a conventional aqueous print thickening. The two thickenings are then thoroughly mixed and are made up with water or a print thickening to 1,000 parts.

The fabric printed with this print paste is subjected to an aftertreatment and made ready for use in a conventional manner, such as, for example, mentioned in the previous dyeing examples. This gives a strong bordeaux printing pattern having good fastness properties.

Alternatively, the print paste can also be prepared as follows: 11.5 parts of 4-chloro-2,5-di(n-butoxy)aniline are stirred into a mixture of 100 parts of water and 21 parts of a 32 % strength aqueous hydrochloric acid solution and diazotized at a temperature of about 5° C. with 9 parts of a 40 % strength aqueous sodium nitrate solution. 6 parts of acetic acid and 9 parts of sodium acetate trihydrate are additionally added, and the entire mixture is made up with water and thickening to 1,000 parts.

Dyeing Example 5

The procedure of Dyeing Example 1 is repeated, except that N-(2'-methoxyphenyl)-2-hydroxynaphthalene-3-carboxamide is replaced by the equivalent amount of N-phenyl-2-hydroxynaphthalene-3-carboxamide, N-(4'-methoxyphenyl)-2-hydroxynaphthalene-3-carboxamide, N-(4'methoxy-2'-methylphenyl)-2-hydroxynapthalene-3-carboxamide or N-(2'-methylphenyl)-2-hydroxynaphthalene-3-carboxamide. This also gives bordeaux cellulose dyeings having good fastness properties.

Dyeing Example 6

The procedure of Dyeing Example 1 is repeated, except that instead of 4-chloro-2,5-di(n-butoxy)aniline the same amount of 4-chloro-2,5-di(1'-methylpropoxy)aniline or the equivalent amount of 4-chloro-2,5-di(n-propoxy)aniline is used. This gives bordeaux cellulose fiber dyeings having good fastness properties.

Dyeing Example 7

The procedure of Dyeing Example 3 is repeated, except that instead of 3.5 parts of N-(naphtht-1'-yl)-2-hydroxynaphthalene-3-carboxamide 3.0 parts of N-5'-chloro-2',4'-dimethoxyphenyl)-2-hydroxynaphthalene-3-carboxamide or 1.8 parts of N-(4'-chloro-2'-methoxy-5'-methylphenyl)-2-hydroxynaphthalene-3-carboxamide or 1.6 parts of N-(4'-chloro-2',5'-dimethoxyphenyl)-2-hydroxynaphthalene3-carboxamide are used. This also gives bordeaux dyeings of the cellulose fiber material having good fastness properties.

Dyeing Example 8

The procedure of Dyeing Example 3 or 7 is repeated, except that instead of 4-chloro-2,5-di(n-butoxy)aniline the same amount of 4-chloro-2,5-di(2'-methylpropoxy)aniline or the equivalent amount of 4-chloro-2,5-di(n-propoxy)aniline is used. This gives bordeaux dyeings of the cellulose fiber material having good fastness properties.

I claim:

1. A process for the preparation of a water-insoluble azo dye on the fiber by the methods of ice color dyeing, whereby the fiber material bottomed with a coupling component is brought into contact in a aqueous medium with the diazonium compound of an aromatic amine and is coupled, which comprises using as the diazotizable diazo component an aniline compound of the formula (1)

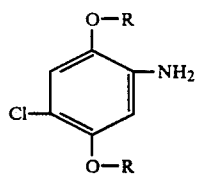

in which R is a straight-chain or branched alkyl group of 3 or 4 carbon atoms, and coupling it with a coupling component customary in ice color dyeing, the coupling reaction and dye formation on the fiber being carried out at a pH between 3 and 10.

2. The process as claimed in claim 1, wherein an aromatic amine of the formula (1) is used, in which R is an n-propyl, n-butyl, 1-methyl-propyl or 2-methyl-propyl group.

3. The process as claimed in claim 1, wherein an aromatic amine of the formula (1) is used in which R is the isopropyl or 1,1-dimethyl-ethyl group.

4. The process as claimed in claim 1, wherein the coupling component is a compound corresponding to the formula (2)

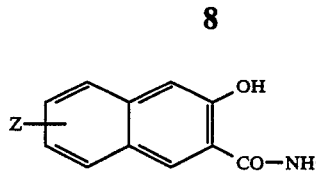

in which Z is hydrogen, halogen or alkoxy of 1 to 4 carbon atoms and Aryl is phenyl or 1-naphthyl, or is phenyl or 1-naphthyl substituted by 1, 2 or 3 substituents selected from the group consisting of halogen, nitro, alkyl of 1 to 4 carbon atoms and alkoxy of 1 to 4 carbon atoms.

5. The process as claimed in claim 2, wherein the coupling component is a compound corresponding to the formula (2)

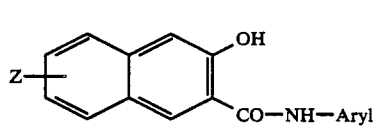

in which Z is hydrogen, halogen or alkoxy of 1 to 4 carbon atoms and Aryl is phenyl or 1-naphthyl, or is phenyl or 1-naphthyl substituted by 1, 2 or 3 substituents selected from the group consisting of halogen, nitro, alkyl of 1 to 4 carbon atoms and alkoyx of 1 to 4 carbon atoms.

6. The process as claimed in claim 3, wherein the coupling component is a compound corresponding to the formula (2)

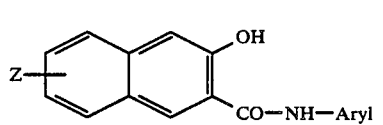

in which Z is hydrogen, halogen or alkoxy of 1 to 4 carbon atoms and Aryl is phenyl or 1-naphthyl, or is phenyl or 1-naphthyl substituted by 1, 2 or 3 substituents selected from the group consisting of halogen, nitro, alkyl of 1 to 4 carbon atoms and alkoxy of 1 to 4 carbon atoms.

7. The process as claimed in claim 1, wherein the radical Aryl in the coupling component of the formula (2) used is phenyl, 2-methylphenyl, 2-methoxyphenyl, 4-methoxyphenyl, 2-ethoxyphenyl, 4-ethoxyphenyl, 4-methoxy-2-methylphenyl 2,5-dimethoxyphenyl, 4-chlorophenyl, 4-chloro-2-methylphenyl, 5-chloro-2-methoxyphenyl, 4-chloro-2-methoxy-5-methylphenyl, 4-chloro-2,5-dimethoxyphenyl, 5-chloro-2,4-dimethoxyphenyl or 1-naphthyl.

8. The process as claimed in claim 2, wherein the radial Aryl in the coupling component of the formula (2) used is phenyl, 2-methylphenyl, 1-methoxyphenyl, 4-methoxyphenyl, 2-ethoxyphenyl, 4-ethoxyphenyl, 4-methoxy-2-methylphenyl, 2,5-dimethoxyphenyl, 4-chlorophenyl, 4-chloro-2-methylphenyl, 5-chloro-2-methoxyphenyl, 4-chloro-2-methoxy-5-methylphenyl, 4-chloro-2,5-dimethoxyphenyl, 5-chloro-2,4-dimethoxyphenyl, or 1-naphthyl.

9. The process as claimed in claim 3, wherein the radial Aryl in the coupling component of the formula (2) used is phenyl, 2-methylphenyl, 2-methoxyphenyl, 4-methoxyphenyl, 2-ethoxyphenyl, 4-ethoxyphenyl, 4-methoxy-2-methylphenyl, 2,5-dimethoxyphenyl, 4-chlorophenyl, 4-chloro-2-methylphenyl, 5-chloro-2-methoxyphenyl, 4-chloro-2-methoxy-5-methylphenyl, 4-chloro-2,5-dimethoxyphenyl, 5-chloro-2,4-dimethoxyphenyl or 1-naphthyl.

* * * * *